Nov. 3, 1964  M. SIEBKER  3,155,547
METHOD FOR PRODUCING ELECTRIC ENERGY FROM NUCLEAR REACTIONS
Filed April 20, 1959  3 Sheets-Sheet 2

INVENTOR
MANFRED SIEBKER

BY

Nov. 3, 1964    M. SIEBKER    3,155,547
METHOD FOR PRODUCING ELECTRIC ENERGY FROM NUCLEAR REACTIONS
Filed April 20, 1959    3 Sheets-Sheet 3

INVENTOR
MANFRED SIEBKER

United States Patent Office 3,155,547
Patented Nov. 3, 1964

3,155,547
METHOD FOR PRODUCING ELECTRIC ENERGY FROM NUCLEAR REACTIONS
Manfred Siebker, Gummersbach, Rhineland, Germany, assignor to L. & C. Steinmuller G.m.b.H., Gummersbach, Rhineland, Germany
Filed Apr. 20, 1959, Ser. No. 807,361
8 Claims. (Cl. 136—86)

The present invention relates to the production of electric energy from atomic nuclear reactions in atomic fission reactors and atomic nuclear fusion reactors.

It has hitherto been known to exploit the heat obtained in nuclear reactions by means of thermodynamic processes, in other words to exploit the said heat directly or indirectly for purposes of evaporating water and to utilize the thus obtained steam in standard turbines in cooperation with generators. Also the employment of gas turbines has been suggested. These conventional methods have the fundamental drawback that heretofore by their use only approximately one-fourth to one-third of the introduced heat energy could thereby be converted into electric energy. In contrast thereto, the present invention is based on the fact that by utilizing chemical fuel elements, the electrochemical working potentials can be converted into electric energy up to close to 100 percent. Devices suitable for this purpose are, for instance, electrolytic cell elements such as the so-called Klingel elements, accumulators, and gas elements. Also, it has been possible in a fuel cell to successfully oxidize carbon to carbon dioxide for the production of electric energy, however, considerable difficulties have been encountered in attempts to exploit this method on a large scale for industrial purposes.

The fundamental problems that are encountered in connection with the utilization of chemical fuel cells involved primarily the following:

A. Very pure starting substances are required which are, for instance, lacking in employing industrial coal.

B. With gas cells, mostly gases are required which are relatively costly to produce and already, in view of the manner of their technical production such, for example, as coal gasification or water gas reaction, considerably reduce the total degree of efficiency.

It is, therefore, an object of the present invention to provide a method of and an arrangement for producing electric energy from atomic nuclear reactions which will overcome the above mentioned drawbacks.

It is another object of this invention to provide a method and an arrangement of the type set forth in the preceding paragraph which will make it possible to feed pure substances to the chemical fuel cell while at the same time avoiding the addition of impurities from the outside.

A further object of this invention is to provide a method of and an arrangement for producing electric energy from atomic nuclear reactions while employing gas cells, which will make it possible to convert the heat freed in the nuclear reactor into electric energy at a degree of efficiency which approaches 100 percent.

These and other objects and advantages of the invention will appear more clearly from the following description.

In conformity with the present invention, the above mentioned drawbacks concerning the exploitation of the nuclear process, on one hand, and the production of electric energy in chemical fuel cells, on the other hand, have been overcome by employing the heat freed at high temperatures in the nuclear reactor for the purpose of thermically dissociating substances which due to the chemical potential created in this connection and due to their other technical properties will be able in a chemical fuel cell to produce electric energy in a manner which is known per se. As the working medium, for instance steam or carbon dioxide may be employed. In conformity with the invention, during this process, the thermically dissociated components of the working means passing through the reactor in a circuit are separated from each other by one of the known methods as, for example, by selective diffusion. According to a preferred method of the invention, the said dissociated components prior to entering the chemical fuel cell are cooled down, up to the temperature of operation prevailing in said fuel cell.

The quantity of heat which is freed from the thermically separated components in the reactor by cooling down to fuel element temperature, may be employed either for producing electric energy according to an analog electrochemical process or may be exploited in a conventional thermodynamic manner in steam power installation. Furthermore, there exists the possibility, prior to said heat entering the reactor, of employing the said heat for a recuperative preheating of the working medium discharged from the chemical fuel element.

For purposes of further improving the process, a portion of the circulating working medium may either continuously or discontinuously be withdrawn from the circuit and be replaced by an equal portion of fresh working medium introduced into the circuit. Also, in this instance, the heat may be exchanged in a recuperative manner. That portion of the working medium which is withdrawn from the circuit may be selected as to quantity in such a way that the substances as, for instance, fission products of the nuclear fission, will not harmfully affect either the concentration of impurity in the nuclear or fusion process, or in the process in the chemical fuel element. In other words, the withdrawn quantity should be held within certain limits and may, after being subjected to a purification process, again be introduced into the circuit.

According to a further development of the invention, also a plurality of working means and/or a plurality of circuits may be employed. Furthermore, a simplification of the total procedure may be obtained by employing the working medium or media or a portion thereof, at the same time as a moderator in a thermal nuclear reactor.

A further improvement of the method according to the invention may be obtained by accelerating the thermic dissociation in the nuclear reactor by catalytic means.

The present invention makes it possible to feed at all times pure substances into the chemical fuel cells, while preventing the admixture of impurities thereto from the outside. By proper selection of the working medium, the ratio of the chemical energy stored in the nuclear reactor by the endothermic reaction of the working medium to the physical heat content of the working medium is very high so that the heat freed in the core reactor can be converted into electric energy at a degree of efficiency which is close to 100 percent.

Inasmuch as the electromotive force in the chemical fuel elements has a magnitude of about one volt, whereas the desired usable technical voltages are considerably higher, it is expedient to arrange in series a considerable number of such fuel elements, while the flow of the working medium to and from the said elements arranged in series, may pass through one and the same nuclear reactor.

In order to provide for a clear understanding of the manner of carrying out the present invention, the following figures and examples are submitted.

*Example 1*

Figure 1:
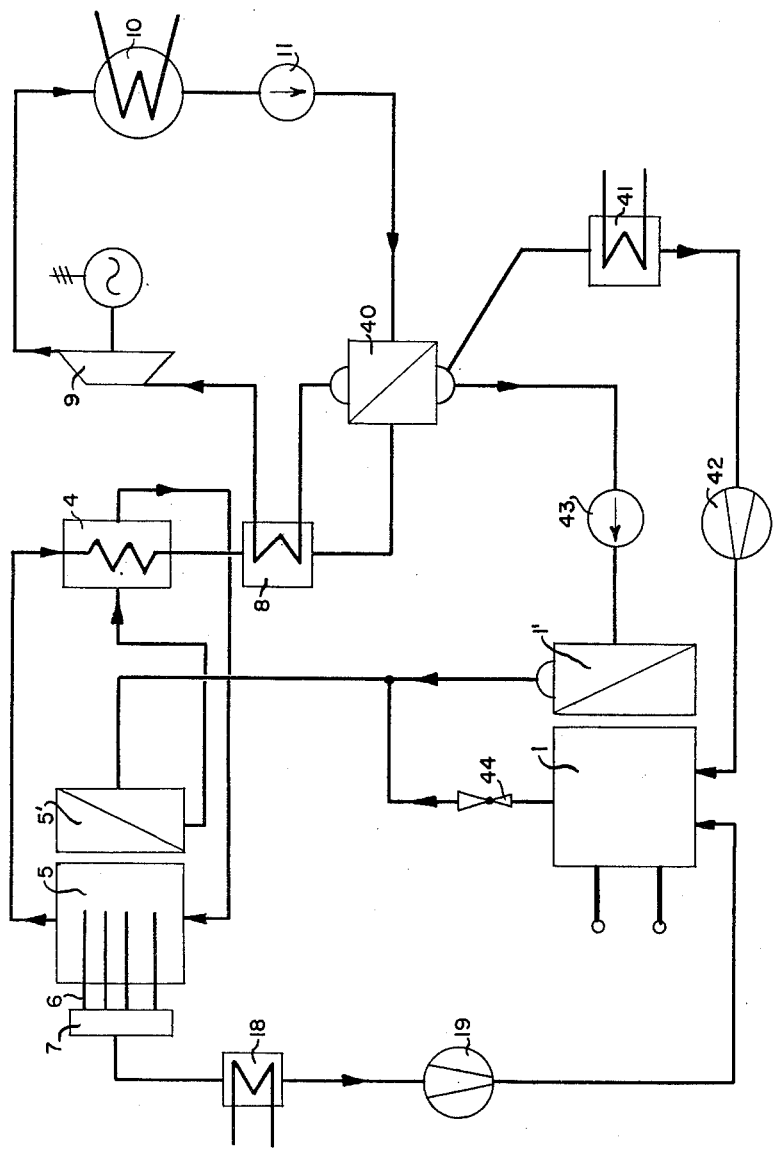
FIG. 1 shows a complete arrangement according to the present invention for producing electric energy from atomic nuclear reactions.

Referring now to FIG. 1, recombination water leaving a group of direct current generating hydrogen-oxygen cells 1 of the low temperature type which are subject to a pressure of 20 ata. and which operate at a temperature of 192° C., flows at a rate of 9 t./h. through a relief valve 44 into a line in which it mixes with a flow of 80 t./h. water-steam mixture at a temperature of 179° C. and a pressure of 10 ata. This resulting flow of 89 t./h. of water-steam mixture then contacts an evaporator heating surface 5' designed in the manner of a water tube boiler with steam drum and serving the purpose of absorbing the heat transferred from the outer surface of a reactor core 5 of a high temperature reactor. In the evaporator 5' the steam-water mixture completely evaporates and then flows into a heat exchanger 4 which acts as a superheater for steam which is to be heated from 179° C. to 1200° C. From there the steam is conveyed into the core of the high temperature reactor 5 which may be externally moderated by platinum-canned graphite and which contains ball-shaped $UO_2$ as fuel. In this reactor core area the entering steam is heated up to 1600° C. At this temperature about 0.5 percent of the steam is dissociated, provided that the ratio of hydrogen to oxygen is in stoichiometric proportion. Tubes 6 numbering as high as 2,000, and composed of sintered corundum permeable to gas, provided with a 0.05 mm. thick platinum coating project into the reactor core. The platinum has the effect of a partition wall permeable to hydrogen and at the same time performs the function of a catalyst in promoting equilibration. The hydrogen discharge tubes, which have an outer diameter of 30 mm. and an effective length of 1500 mm., lead into a cooled steel header 7 outside the reactor core. The hydrogen emerging therefrom is conveyed through a cooler 18 into a compressor 19 and then flows under a pressure of 20 ata. and at a temperature of 125° C. to the direct current cells 1.

The tubes 6 have a platinum surface area of 300 m.$^2$ and the pressure in the tubes is maintained at 2 torr (millimeters mercury column). The quantity of hydrogen diffusing through one square meter of the platinum surface amounts to about 10 normal liters per second, whereby one t. is discharged per hour. The corresponding energy loss is 39 mw. in view of the steam temperature rise from 1200° to 1600° C. as well as the heat transfer to the evaporator heating surface 5', the reactor produces about 92 mw. heat.

The oxygen at the rate of 8 t./h., corresponding to the separated hydrogen, flows together with non-dissociated steam at the rate of 80 t./h. from the reactor core 5 into the heat exchanger 4, which as heretofore stated, acts as a superheater for the steam flowing into the reactor core. Inasmuch as the pressure on the primary side and on the secondary side are very nearly the same and since absolute tightness is not imperative, the heat transfer surfaces having temperatures of more than 700° C. may consist of ceramic materials or cermets. The steam, which enters at a temperature of 179° C. and which has to be superheated, is made to flow in a suitable manner so that the container wall of the superheater 4 will be kept at a relatively low temperature. With a view to obtaining a minimum heat loss, the superheater is arranged in close proximity to the reactor core 5. The oxygen-steam mixture cooled in heat exchanger 4 from 1600° C. to about 525° C. flows through the heat exchanger 8 and in the latter is heated up to 450° C. and carried into the turbine 9 which is arranged in the normal circuit together with the condenser 10 and the feed pump 11.

The condensate separated from the oxygen in the steam transformer 40 is conveyed by the pump 43 to the heating surface of the pre-evaporator 1' which is heated by the waste heat from the direct current cells 1. The oxygen is cooled in the cooler 41 and conducted through the compressor 42 to the cells 1 under a pressure of 20 ata. These cells correspond to the type described in Paper 119 K4 of the Ffth World Conference in Vienna, pages 12 and 13. There are 8,280 element cells, each having four square meters effective electrode surface, each group of 552 cells being electrically connected in series. In FIG. 1, for the sake of simplicity, the entire group of cells 1 is treated as a whole. In the cells 1 about 30 mw. at 500 volts are generated. In addition about 13 mw. alternating current from the alternator of turbine 9 are generated. After subtraction of the power requirement for the plant, this corresponds to a net efficiency of the entire plant amounting to about 46 percent.

*Example 2*

Figure 2:
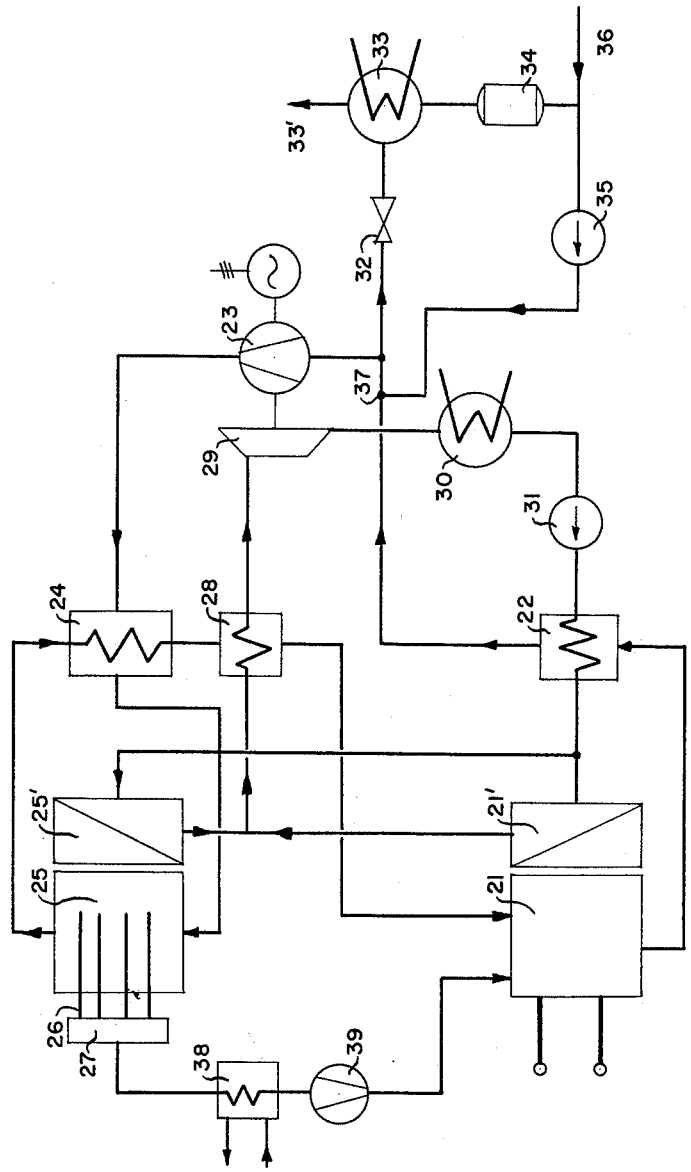
FIG. 2 shows a somewhat different complete arrangement according to the present invention for producing electric energy from atomic nuclear reactions.

Referring now to FIG. 2, the recombination steam leaving a group of direct current generating hydrogen-oxygen cells 21, which are of the low pressure-high temperature type, is conveyed at the rate of 9 t./h. together with 80 t./h. circulation steam at a pressure of 4 ata. and a temperature of 500° C., into a heat exchanger 21' wherein it cools down to 350° C. The steam then proceeds to a compressor 22 wherein it is compressed to a pressure of 6 ata., the temperature rising to about 450° C. In this condition the steam enters the heat exchanger 24, wherein the temperature is increased to 1300° C. From the heat exchanger the steam is carried into the core of a high temperature reactor which consists of ceramic fuel elements having a working temperature of 1600° C. With this temperature the stoichiometric ratio of hydrogen to oxygen being maintained, about 0.5 percent of the steam is dissociated in a state of equilibrium. As in the case of Example 1, a number of tubes 26 in this case numbering 2,000 formed of sintered corundum permeable to gas, and having a 0.05 mm. platinum coating, project into the reactor core. The platinum serves as a permeable partition wall through which the hydrogen may pass and further serves simultaneously as a cataylst to develop a speedy equilibration. The hydrogen discharge tubes, which have an outer diameter of 30 mm. and an effective length of about 1500 mm., lead into headers 27 outside the reactor core. These headers are cooled down to about 500° C. and therefore may be composed of steel as are also the tubes through which the hydrogen is carried.

For cooling the headers as well as for removing the heat which penetrates the heat insulation of the reactor core, heating surfaces are provided similar to those of high pressure water tube boilers. On the diagram (FIG. 2) the arrangement of the heat-absorbing tubes inside the reactor is marked with the reference numeral 25'.

The area of the platinum surface of the hydrogen discharge tubes in the reactor core is 300 square meters. The pressure in these tubes is maintained at one torr (millimeters mercury column). With a steam pressure in the reactor core of 5÷6 ata., the hydrogen discharge is about one t./h. As in the case of Example 1, the corresponding energy loss is 39 mw. In view of the heat losses caused by the heat-absorbing surfaces 25' and the increase in temperature of the entering steam from 1300° C. to 1600° C. the reactor produces 53 mw. of heat. The oxygen flowing at a rate of 8 t./h. corresponding to the removed hydrogen, flows at a rate of 80 t./h. together with non-dissociated steam from the reactor core into the heat exchanger 24 which acts as a super-heater for the steam flowing to the reactor core. The oxygen-steam mixture cooled in the superheater from 1600° C. to about 730° C. then passes through the heat exchanger 28 and enters the oxygen-hydrogen cell 21 at a temperature of about 650° C. and a pressure of about 4 ata.

In order to avoid great heat losses, the heat exchanger 24 is, of course, arranged within close proximity of the reactor core and forms with the same one unit.

In a manner analogous to the arrangement of the reactor, the block of the direct current generating high temperature cells is also provided with heat absorbing tube heating surfaces which are similar to those of a high pressure steam boiler. In the diagram (FIG. 2) these are generally designated by the reference numeral 21'. The steam at 200 ata. produced in heat exchanger 21' and in heat exchanger 25', superheated to about 400° C., is heated up in the heat exchanger 28 to a temperature of 650° C. and then caused to flow into the turbine 29. The latter drives the compressor 23 as well as an alternating current generator of 3.6 mw., which may be employed to supply the 0.6 mw., power required for the operation of the plant. The steam leaving the turbine 29 is condensed in the condenser 30. The fuel pump 31 forces the condensate at the pressure of 200 ata. into the pre-heater 22 where it is heated to a temperature ranging from 40° C. to 300° C. At such temperature it then enters the evaporation surfaces of heat exchanger 21' and 25'.

As the medium, which flows through the high temperature reactor, while circulating, obviously entrains corrosion products, which develop an undesired activity and may unfavorably affect the operation of the compressor and the efficiency of the heat transfer surfaces, there is provided a parallel circuit for purposes of cleaning. This cleaning circuit may also be used for the removal of fission products which have escaped from the fuel elements of the high-temperature reactor. For these purposes, a partial flow, on the order of 0.5 percent, may be diverted and depressurized, with the aid of the relief valve 32 before entering the compressor, to a pressure not far from atmospheric, and cooled in the cooler 33 below condensation point. Non-condensable gases like xenon may be blown off from cooler 33 together with a certain amount of steam. The condensate obtained in cooler 33 then flows through a de-contamination filter 34 and therefrom is carried back by the pump 35 into the main circuit. This effect is obtained by injection of purified water into the steam flow at a temperature of 350° C. and a pressure of about 4 ata. at point 37. With the injected water there may be also fed make-up water which can be fed in at point 36. The distance between the injection point 37 and the branching-off place of the cleaning circuit is so great that the injected water is completely evaporated wheen reaching the latter. The temperature of the primary circuit steam at the entrance of the compressor 23 may be reduced by any cooling circuit circuit in a suitable and adjustable manner.

For starting the plant a starting line is provided (not shown on the diagram) which bypasses the direct current cells in such a way that the primary flow from the heat exchanger 28 is directly conducted to the heat exchanger 22.

The hydrogen leaving the header 27 at a pressure of about atmospheric and a temperature of about 500° C. flows through the cooler 38 at a temperature of about 100° C. into the compressor 39 which it leaves at a temperature of about 120° C. and at a pressure of about 4 ata. and is therefrom conveyed to the direct current cells 21. As will be understood, this line is closed at the time of starting the entire plant, inasmuch as the reactor 25 in the beginning of the process serves only for purposes of heating the heat exchanger 25.

As an oxygen-steam mixture is fed into the direct current cells instead of pure oxygen, the efficiency of the cells is correspondingly low. In this case it is expected to be about 69 percent. The type of cell that may be used in the present example corresponds to the high pressure hydrogen-oxygen cells as described in Paper 119 K4 of the Fifth World Power Conference, Vienna, 1956, pages 6 and 7.

With the above mentioned data, a total plant net efficiency of about 57 percent is obtained.

Figure 3:
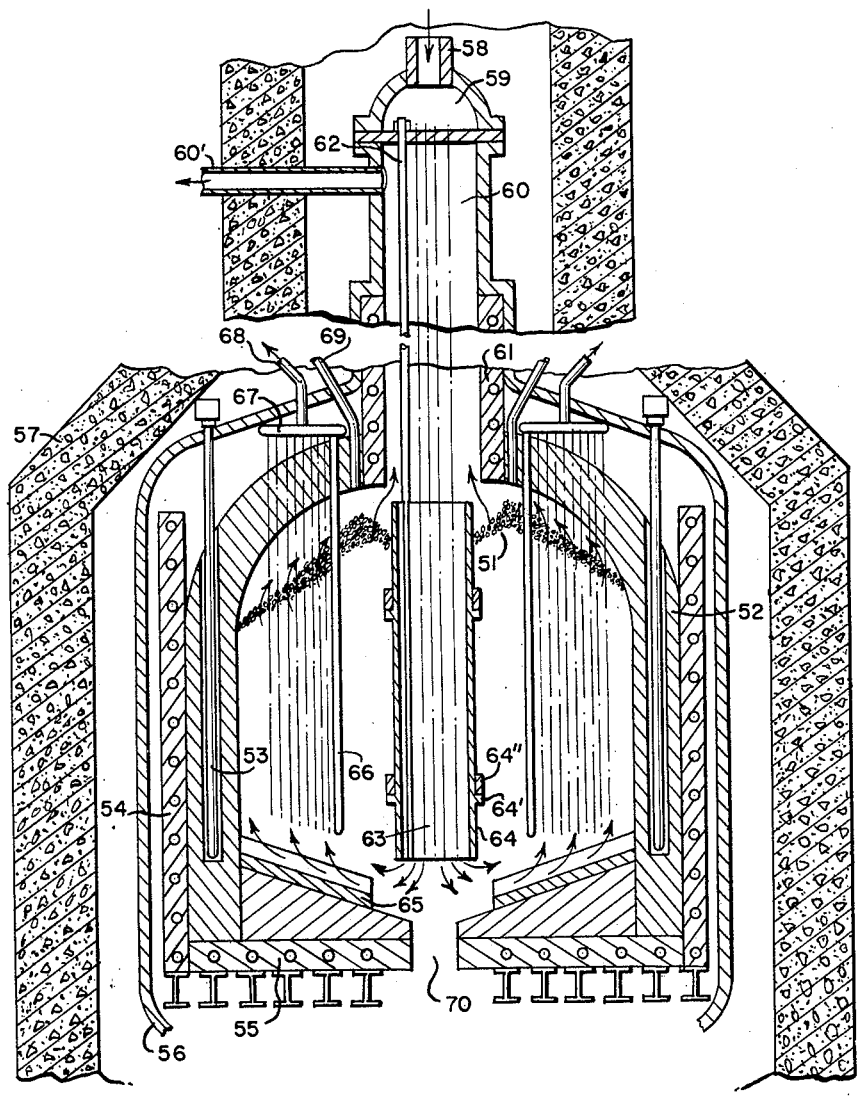
FIG. 3 shows in detail a reactor corresponding to 5 in FIG. 1 or 25 in FIG. 2, suitable in the practice of the invention.

Referring to FIG. 3, there is shown a vertical section through a reactor suitable for use in the practice of the invention. Reference numeral 51 indicates a pile of fuel compacts or balls consisting of a fissionable material such as $UO_2$ together with a moderator such as BeO. A suitable ball size would be about 7 to 10 mm. in diameter. This pile constitutes the reactor core area and is arranged in a container 52 formed of high temperature resistant material which simultaneously serves as a reflector, such, for example as BeO. The control and shut-down rods 53 extend into this reflector wall. The said control and shut-down rods make it possible to vary the output of the reactor by changing the amount of neutron reflection. Laterally around the reflection area there is disposed a thermal shield 54 which may be suitably cooled by a coolant medium. Preferably, the cooling is carried out in conformity with the La Mont principle, that is to say, steam is produced in the thermal shield. A lower supporting plate 55 is provided which is cooled and which operates in the same effective manner as the shields 54.

The entire reactor is enclosed in a gas-tight pressure envelope 56. In the manner understood in the art a biological screening means 57 is arranged outside and around the container 56.

The steam which serves as a cooling and working means and which may be produced entirely or partly in the cooling shields 54 and 55 and also in the cooling means 61 described further below, enters through connections 58 into a distributing hood 59 and from there passes through ceramic pipes 62 which, in the interior of the reactor core, are of uniform cross section bore, and on the outside are of hexagonal shape, whereby the tubes may be closely bundled and together form a practically solid unit. This bundle of hexagonal elements which may be formed of sinter clay, is held together by six outer plates 64' which, in their turn, are held relative to each other by half open rings 64". In conformity with the shape of the lower parts 63 of pipes 62, the entire bundle within the area of the reactor core has the shape of a hexagon. The steam first heated up in the area 60 will, when passing through the area of the reactor means, be further heated and will be discharged at the lower end of the reactor core. Here it will distribute itself over the entire cross section of the reactor pile and will pass through the same from the bottom to the top. In order to improve the distribution of the steam, there is provided a guiding grate 65 the free cross section of which between the grate ribs is less than the small ball diameter of the pile.

When the steam or other gaseous working means leaves the reactor core, it is cooled off within the heat exchange area 60 and passes through connection 60' to the heat exchanger 4 or 24 shown in FIGURES 1 and 2, respectively. That portion of the heat exchanger 60 which faces the reactor core has a cooled wall 61, while the cooling pipes serve simultaneously for suspending the high-temperature-resistant mass.

The pipes 66 extend into the ball pile of the reactor core and consist, as has hitherto been pointed out, of a gas permeable fire resistant material having a thin platinum skin. Hydrogen, freed by thermal dissocation, diffuses into these pipes in the reactor core at a temperature of operation of about 1600° C. and passes into the chambers 67 and from there through connections 68 to the fuel cells. The chambers 67 are cooled by cooling devices (not shown in the drawings).

Charging of the reactor is effected by means of passages 69, and the spent fuel elements are removed through the opening 70.

The reactor illustrated in FIG. 3 is of a basic type which has been described in literature, and is similar to the so-called "potato" reactor designed by BBC-Krupp (Dr. Schulten).

The present application is a continuation-in-part of my application Serial No. 725,636, filed April 1, 1958, now abandoned.

It will, of course, be understood that the present invention is, by no means, limited to the particular description and arrangement set forth in the preceding description but also comprises any and all modifications within the scope of the invention and the purview of the appended claims.

What I claim is:

1. A method of producing electric energy from heat derived from atomic nuclear reactions, which includes the steps of: circulating steam through a nuclear reactor, dissociating said steam in said reactor by the heat freed at high temperature in said reactor, separating the dissociated components of said steam, cooling the thus separated components, converting the potential electrochemical energy of said dissociated components directly into electric energy by means of an electrochemical fuel cell, and following the passage of the said components through said electrochemical fuel cell, affecting a recuperative working by the heat freed during the cooling off of the separated components.

2. A method of producing electric energy from heat derived from atomic nuclear reactions, which includes the steps of: circulating steam through a nuclear reactor, dissociating said steam in said reactor by the heat freed at high temperature in said reactor, separating the dissociated components of said working medium, cooling the thus separated components, converting the potential electrochemical energy of said dissociated components directly into electric energy, and passing the heat freed during the cooling off of the separated components through a circuit with at least one electrochemical fuel cell in said circuit.

3. A method according to claim 2, which includes the step of recuperatively exchanging the heat.

4. A method according to claim 1, which includes the steps of: withdrawing a portion of the said steam at a point of the medium circulation between the reactor and the electrochemical fuel cell, and replacing the withdrawn portion of the said steam by a fresh portion.

5. A method according to claim 1, which includes the steps of: withdrawing a portion of said steam at a point of the steam circulation between said reactor and said electrochemical fuel cell, and replacing the withdrawn portion of said steam by a fresh portion, the withdrawn portion of said steam being of a magnitude sufficient to keep the concentration of impurities in the cycle within certain limits so as not to affect the operation of the nuclear reactor infavourably.

6. A method according to claim 1, which includes the steps of: withdrawing a portion of said steam at a point of the steam circulation between said reactor and said electrochemical fuel cell, and replacing the withdrawn portion of said steam by a fresh portion, the withdrawn portion of said steam being of a magnitude sufficient to keep the concentration of impurities in the cycle within certain limits so as not to affect the process in the electrochemical fuel cell.

7. A method according to claim 1, which includes the steps of: withdrawing a portion of said steam at a point of the steam circulation between said reactor and said electrochemical fuel cell, replacing the withdrawn portion of said steam by a fresh portion, purifying the withdrawn portion of said steam and returning the thus purified portion to the circuit of said steam.

8. A method of producing electric energy from heat derived from atomic nuclear reactions, which includes the steps of: circulating steam through a nuclear reactor, dissociating said steam in said reaction by the heat freed at high temperature in said reactor, separating the dissociated components of said steam, cooling the thus separated components to approximately the temperature of operation of an electrochemical fuel cell operating on gaseous fuel, converting the potential electrochemical energy of said dissociated components directly into electric energy, and passing the heat freed during the cooling off of the separated components through a plurality of circuits with at least one electrochemical fuel cell operating in one of said circuits.

References Cited in the file of this patent

UNITED STATES PATENTS

| 2,384,463 | Gunn et al. | Sept. 11, 1945 |
| 2,581,650 | Gorin | Jan. 8, 1952 |
| 2,581,651 | Gorin | Jan. 8, 1952 |

FOREIGN PATENTS

| 457 | Great Britain | of 1885 |
| 901,046 | France | Oct. 23, 1944 |
| 1,079,311 | France | May 19, 1954 |
| 1,006,084 | Germany | Apr. 11, 1957 |